7689X
D. Adams.
Carding Mach.
No 11
Patented Jul. 29, 1833.
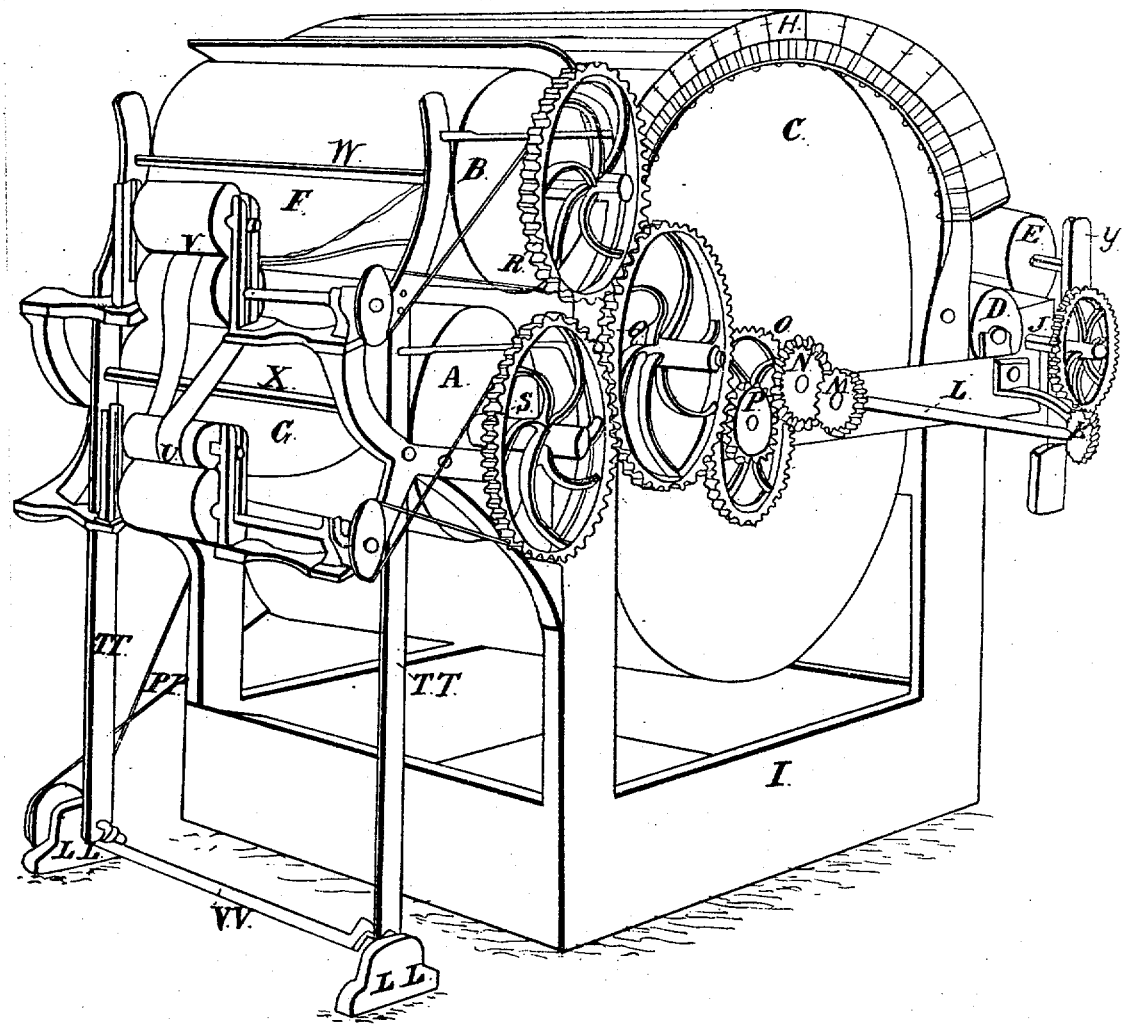
N. PETERS, PHOTO-LITHOGRAPHER, WASHINGTON, D. C.

7689X

July 29 1833

David Adams Richmond Virginia

Letters Patent

The Schedule referred to in these Letters Patent and making part
of the same containing a description in the words of the said David
Adams himself of his Improvement in the Cotton or wool Carding
Machine To all to whom these presents shall come Be it known
that I David Adams of Richmond in the County of Henrico and State
of Virginia have invented a new and useful improvement in Cotton
or wool Carding machines & especially in Cotton Carding machines
by adding one or more doffing Cylinders to said machine in addition to
the one heretofore used whereby one half more work and of a better quality
can be done by the machine in the same time than according to its present
structure & that the following is a full and exact description of the construct
-ion and operation of the said machine as invented or improved by me of
which I claim only the advantage of the newly invented or discovered
part (to wit) the second Doffing Cylinder indicated on the drawing which
accompanies this declaration by the letter A the process of which will be
to keep the main Cylinder more free from an overload of Cotton or wool
whereby the machine is enabled to do one half more work & of a better
quality than it can do according to its present structure. The letter B on
the said drawing is a doffing Cylinder by which the cotton or wool is taken
off the main Cylinder C The reason of its being called the doffer is
because the cotton or wool being supposed to be carded as well as it
could be it was taken or doffed off the Cylinder C But the single
doffing Cylinder B can never take or doff all the Cotton or wool off the
main Cylinder that ought to be taken off, but will leave so much that a
great portion is lost by the velocity of the main Cylinder C or wasted
and what is not so taken off by the single doffer marked on the said
drawing B is carried round again on the main Cylinder C which keeps
the cards so full that they cannot card with the ease desired. The

[illegible]

7689X invention of this declarant is the addition of a second doffing Cylinder indicated and marked on the drawing which accompanies the declaration by the letter A + which catches + delivers a Sheet of Cotton or Wool indicated on the same drawing by the letter G and which being taken off at that particular point is the best part of the Carding that can be made. Before the said inven-tion of the said second Doffer the Sheet of Cotton G was on the main Cylinder + could not be taken off in the old way of Carding. The upper Doffer B does as much work with the lower doffer A as it did before its addition and what is done by the lower doffer A is exactly so much additional work done by the Machine.

The advantages to be derived from the use of the additional Doffer are that a Carding Wool or Cotton Machine will do twice as much work with it as it will do without it — the work will be much better done there will be much less flying or waste + it will require but a trifle more power to drive the machine.

In testimony whereof I have hereunto set my hand and affixed my seal this 20 day of March 1832

David Adams.

Witnesses
Jno Shore }
Robert G. Scott }

Dr in portfolio

[illegible]

[660 n. 5?] .